(12) United States Patent
Adachi et al.

(10) Patent No.: US 7,360,619 B2
(45) Date of Patent: Apr. 22, 2008

(54) MOTORCYCLE FRAME STRUCTURE

(75) Inventors: Eiji Adachi, Saitama (JP); Yasuhiro Nakayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 314 days.

(21) Appl. No.: 10/788,245

(22) Filed: Feb. 26, 2004

(65) Prior Publication Data
US 2004/0182634 A1 Sep. 23, 2004

(30) Foreign Application Priority Data
Feb. 27, 2003 (JP) .............................. 2003-051655

(51) Int. Cl.
*B62D 61/02* (2006.01)
(52) U.S. Cl. .................... 180/219; 180/311; 280/281.1
(58) Field of Classification Search ................ 180/311, 180/312, 219; 280/281.1
See application file for complete search history.

(56) References Cited

U.S. PATENT DOCUMENTS

| | | | | |
|---|---|---|---|---|
| 4,673,053 A | * | 6/1987 | Tanaka et al. ............... | 180/227 |
| 4,690,236 A | * | 9/1987 | Shinozaki et al. .......... | 180/219 |
| 5,261,504 A | * | 11/1993 | Katsura ....................... | 180/219 |
| 5,704,442 A | * | 1/1998 | Okazaki et al. ............. | 180/219 |
| 6,186,550 B1 | * | 2/2001 | Horii et al. .................. | 280/833 |
| 6,523,631 B2 | * | 2/2003 | Uneta et al. ................ | 180/228 |
| 6,679,347 B2 | * | 1/2004 | Iimuro ........................ | 180/219 |
| 6,695,089 B2 | * | 2/2004 | Adachi et al. ............... | 180/311 |
| 2001/0023789 A1 | * | 9/2001 | Uneta et al. ................ | 180/218 |
| 2001/0045312 A1 | * | 11/2001 | Adachi et al. ............... | 180/219 |
| 2004/0124032 A1 | * | 7/2004 | Iizuka et al. ................ | 180/311 |
| 2005/0126844 A1 | * | 6/2005 | Ogura et al. ................ | 180/311 |

FOREIGN PATENT DOCUMENTS

JP          62-162182          10/1987

* cited by examiner

*Primary Examiner*—Paul N. Dickson
*Assistant Examiner*—Barry Gooden, Jr.
(74) *Attorney, Agent, or Firm*—Carrier Blackman & Associates, P.C.; William D. Blackman; Joseph P. Carrier

(57) ABSTRACT

A frame structure of a motorcycle includes a head pipe gusset forged integrally with a head pipe, and a front fitting recess to which a front wall and front-half parts of right and left side walls of a down pipe are fit is provided with the head pipe gusset. The structure also includes a forged stiffener pipe gusset, and a rear fitting recess to which a rear wall and rear-half parts of right and left side walls of the down pipe can be fit is provided with the stiffener pipe gusset. The right and left front-half parts of the down pipe are inclined in accordance with a draft angle of the front fitting recess, and the right and left rear-half parts are inclined in accordance with a draft angle of the rear fitting recess.

10 Claims, 13 Drawing Sheets

MOTORCYCLE FRAME STRUCTURE

CROSS-REFERENCE TO RELATED APPLICATION

The present application claims priority under 35 USC 119, based on Japanese patent application No. 2003-051655, filed Feb. 27, 2003.

BACKGROUND OF THE INVENTION

1. Field of the Invention

The present invention relates to a frame structure for a motorcycle, in which a pair of right and left main pipes and a down pipe extend from a head pipe, and further in which the down pipe and the right and left main pipes are coupled to each other by a stiffener pipe. More particularly, the present invention relates to a frame structure for a motorcycle of the type described which improves rigidity and appearance of the frame, while reducing assembly and material costs.

2. Discussion of the Background Art

As a body frame of a motorcycle, a frame structure constructed by a head pipe, a pair of right and left main pipes, a down pipe, and the like is known (refer to, for example, Japanese Utility Model Laid-Open No. Sho 62-162182, particularly to pp 6-8, FIG. 2 thereof).

FIG. 14 is a side view showing a known frame structure of a conventional prior art motorcycle, reproduced from a figure of the above-referenced Japanese patent publication. Reference numerals in FIG. 14 are re-designated from the original.

In the prior art motorcycle frame structure 200 of FIG. 14, a pair of right and left main pipes 203 and 202 extend rearwardly and downwardly from an upper part 201a of a head pipe 201. A down pipe 204 extends downwardly from a lower part 201b of the head pipe 201, while a head pipe gusset 205 extends from the lower part 201b of the head pipe 201, and a front wall side 206 of the down pipe 204 is supported by the head pipe gusset 205.

The head pipe gusset 205 is a member which is cast integrally with the head pipe 201 and is formed in an almost U shape in cross section by a bottom face 207 and right and left side faces 209 and 208. The head pipe gusset 205 is fitted to the down pipe 204.

By fitting the head pipe gusset 205 to the down pipe 204, the bottom face 207 of the head pipe gusset 205 comes into contact with the front wall 206 of the down pipe 204, the left side face 208 comes into contact with a left side wall 210 of the down pipe 204, and the right side face 209 comes into contact with a right side wall 211 of the down pipe 204.

By welding a periphery 208a of the left side face 208 to the left side wall 210 of the down pipe 204 and welding a periphery 209a of the right side face 209 to the right side wall 211 of the down pipe 204, the down pipe 204 is reinforced by the head pipe gusset 205.

In the case where a load F is applied on the head pipe 201 via the front fork toward the front of the body as shown by an arrow, relatively large tensile stress σ1 is produced in the down pipe front wall 206 and relatively large tensile force σ2 is produced in a rear wall 212 of the down pipe 204. On the other hand, large stress is not produced around the center 253 of the right and left side walls 210 and 211 constructing the down pipe 204.

Consequently, the peripheries 208a, 209a of the head pipe gusset 205 are welded around the center 253 of the down pipe 204, thereby enabling the peripheries 208a and 209a of the head pipe gusset 205 to be welded to portions in which no large stress is produced.

The head pipe gusset 205 is a member which is molded integrally with the head pipe 201 by casting. Therefore, at the time of casting the head pipe gusset 205 in an almost U shape in cross section, a draft angle has to be assured in the right and left side faces 209 and 208.

Therefore, at the time of fitting the head pipe gusset 205 to the down pipe 204, a large gap may be created between the left side face 208 of the head pipe gusset 205 and the left side wall 210 of the down pipe 204 and between the right side face 209 of the head pipe gusset 205 and the right side wall 211 of the down pipe 204.

On the other hand, there is a known conventional frame structure for a motorcycle in which right and left main pipes are welded to a head pipe, and an area around the welded portion is reinforced with a reinforcing member, thereby enhancing rigidity of the portion around the head pipe.

When the reinforcing member is used, however, the number of parts increases and it complicates assembly and parts management.

Consequently, a need exists for an improved frame structure for a motorcycle, achieving simplification of the assembling work process and simplification of parts management by reducing the number of parts required.

In another known conventional frame structure for a motorcycle, a stiffener pipe gusset is welded to a rear wall of a down pipe and a stiffener pipe extends from the stiffener pipe gusset to a main pipe.

However, as described above, when a load is applied on the head pipe, relatively large stress/force is produced in the front and rear walls of the down pipe. Consequently, when the stiffener pipe gusset is welded to the rear wall of the down pipe, relatively large stress may be applied to the welded portion.

Therefore, there is still a need for an improved frame structure for a motorcycle capable of preventing the welded portions between the down pipe and the stiffener pipe gusset from being subjected to large stress. Although the known frame structures for a motorcycle have utility for their intended purposes, a need still exists in the art for an improved frame structure for a motorcycle, wherein rigidity and durability are improved without increasing assembly or material costs. In particular, there is a need for an improved frame structure for a motorcycle that increases rigidity and durability of a motorcycle frame, is easy to assemble and does not increase the number of parts.

SUMMARY OF THE INVENTION

An object of the invention is therefore to provide a frame structure for a motorcycle with enhanced rigidity and durability, while using a minimal number of parts.

To achieve such object, according to a first aspect of the present invention there is provided a frame structure for a motorcycle, in which a pair of right and left main pipes extend rearward so as to be inclined downward from an upper part of a head pipe, a down pipe extends from front parts of the main pipes and the head pipe, a front wall side of the down pipe is supported by a head pipe gusset provided in a lower part of the head pipe, a stiffener pipe gusset is provided on a rear wall side of the down pipe, and a stiffener pipe extends from the stiffener pipe gusset to the main pipes, wherein the head pipe gusset is forged integrally with the head pipe and includes a front fitting recess to which a front wall and front-half parts of right and left side walls of the down pipe can be fit, the stiffener pipe gusset is forged and includes a rear fitting recess in which a rear wall and rear-half parts of the right and left side walls of the down pipe can be fit, the right and left front-half parts are inclined in accordance with a draft angle of the front fitting recess, the draft angle being formed at the time of the forging, and the right and left rear-half parts are inclined in accordance with a draft angle of the rear fitting recess, the draft angle being formed at the time of forging, so that the front wall and the right and left front-half parts of the down pipe are fit into the front fitting recess, a periphery of the front fitting recess is welded to the right and left front-half parts, the rear wall and right and left rear-half parts of the down pipe are fit into the rear fitting recess, and a periphery of the rear fitting recess is welded to the right and left rear-half parts.

As defined, each of the head pipe gusset and the stiffener pipe gusset is forged, the front fitting recess of the head pipe gusset is provided for the front wall side of the down pipe, and the rear fitting recess of the stiffener pipe gusset is provided for the rear wall side of the down pipe. Therefore, the front wall side of the down pipe can be reinforced with the head pipe gusset, and the rear wall side of the down pipe can be reinforced with the stiffener pipe gusset.

Further, the front fitting recess in which the front wall and front-half parts of the right and left side walls of the down pipe can be fit is provided with the head pipe gusset, and the rear fitting recess in which the rear wall and rear-half parts of the right and left side walls of the down pipe can be fit is provided with the stiffener pipe gusset.

The periphery of the front fitting recess is welded to the right and left front-half parts, and the periphery of the rear fitting recess is welded to the right and left rear-half parts. Therefore, the head pipe gusset and the stiffener pipe gusset can be welded while avoiding the front and rear walls of the down pipe, in which relatively large stress is produced.

When the head pipe gusset and the stiffener pipe gusset are formed by casting, it is difficult to reduce the thickness and weight while maintaining rigidity of the head pipe gusset and the stiffener pipe gusset. Therefore, the head pipe gusset and the stiffener pipe gusset are molded by forging according to the present invention. Therefore, by the increased material strength of the head pipe gusset and the stiffener pipe gusset, higher rigidity and lighter weight can be realized.

In addition, the front-half parts of the right and left side walls of the down pipe are inclined in accordance with the draft angle of the front fitting recess, and the rear-half parts of the right and left side walls of the down pipe are inclined in accordance with the draft angle of the rear fitting recess. Through such arrangement, gaps between the front fitting recess and the right and left front-half parts, which are generated when the front fitting recess is fit to the front side of the down pipe, is reduced and gaps between the rear fitting recess and the right and left rear-half parts are reduced, thereby stabilizing the welding. Thus, poor welding is decreased and the product quality is stabilized.

According to a second aspect of the invention, in addition to the first aspect, the stiffener pipe gusset extends to a portion between the right and left main pipes near the head pipe.

By extending the stiffener pipe gusset to a portion between the right and left main pipes near the head pipe, the right and left main pipes are reinforced by the stiffener pipe gusset. Thus, rigidity of the portion around the head pipe can be increased. Further, since the stiffener pipe gusset can be also used as a reinforcing member for the main pipe, it is unnecessary to separately provide a reinforcing member for the main pipes, and the number of parts can be reduced.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE INVENTION

Figure 1:
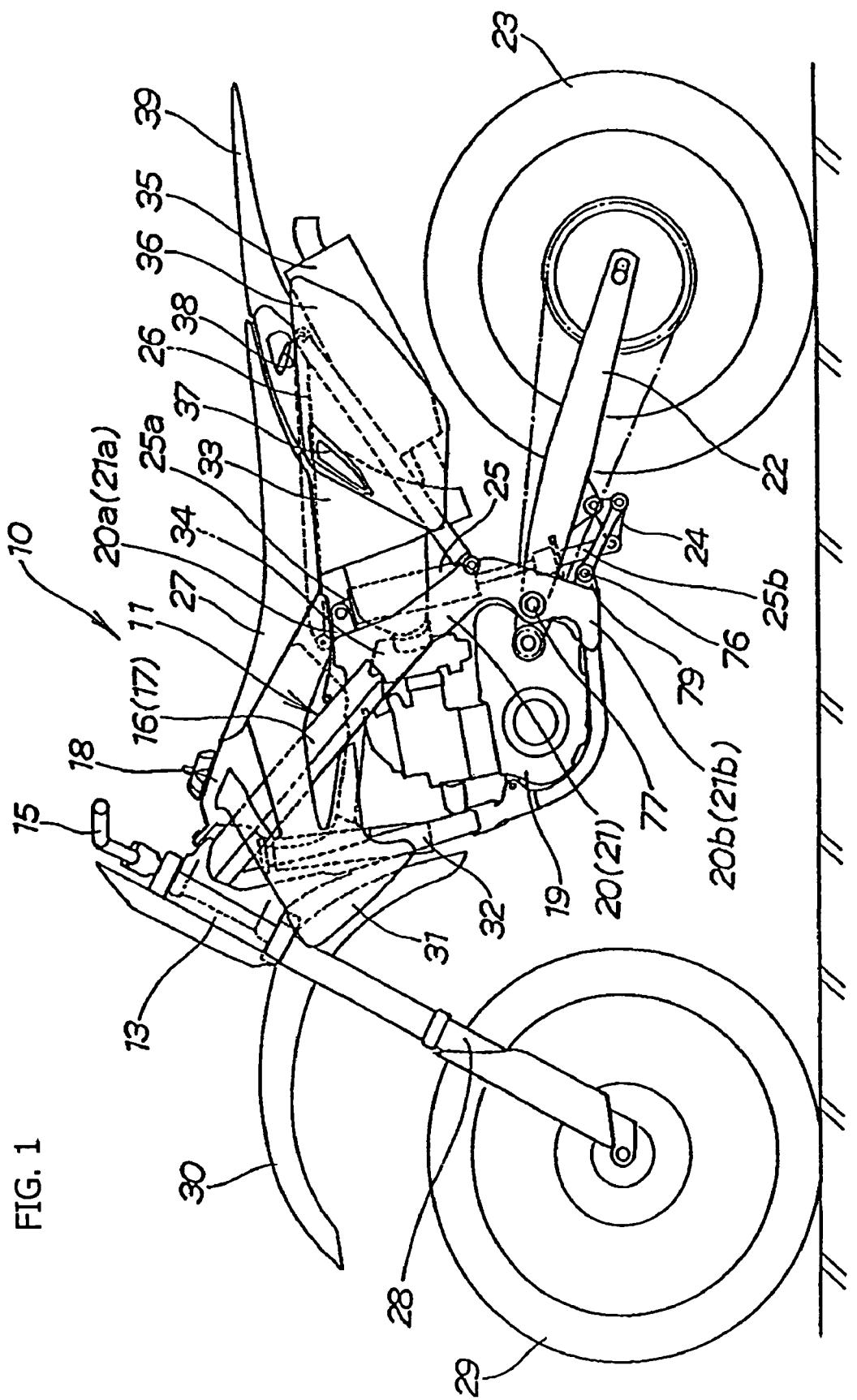
FIG. 1 is a side view of a motorcycle having a frame structure according to an embodiment of the invention.

An embodiment of the invention will be described hereinbelow with reference to the attached drawings. "Front", "rear", "right", and "left" are directions as seen from the driver's perspective. The drawings are to be considered in conjunction with the reference numerals.

FIG. 1 is a side view of a motorcycle having a frame structure according to an embodiment of the invention.

A motorcycle 10 is a vehicle in which a front fork 28 is attached to a head pipe 13 of a frame structure 11, a front wheel 29 is supported by the front fork 28, a handle 15 is attached to the front fork 28, a fuel tank 18 is attached to an upper part of (a pair of right and left main pipes 17 and 16) of the frame structure 11, an engine 19 is provided below the fuel tank 18, a rear swing arm 22 is swingably attached to rear ends (right and left pivot plates 21 and 20) of the frame structure 11, a rear wheel 23 is attached to the rear portion of the rear swing arm 22, a link mechanism 24 is attached to a front end portion of the rear swing arm 22, a lower part 25*b* of a rear cushion 25 is attached to the link mechanism 24, an upper part 25*a* of the rear cushion 25 is attached to rear upper parts (upper parts 20*a* and 21*a* of the pivot plates 20 and 21) of the frame structure 11, a rear frame 26 is attached to a rear portion of the frame structure 11, and a seat 27 is attached to the top of the rear frame 26.

Shown are a front fender 30, a front cowl 31, a radiator 32, an air cleaner 33, a carburetor 34, a muffler 35, a rear cover 36, a first inlet port 37, a second inlet port 38, and a rear fender 39.

Figure 2:
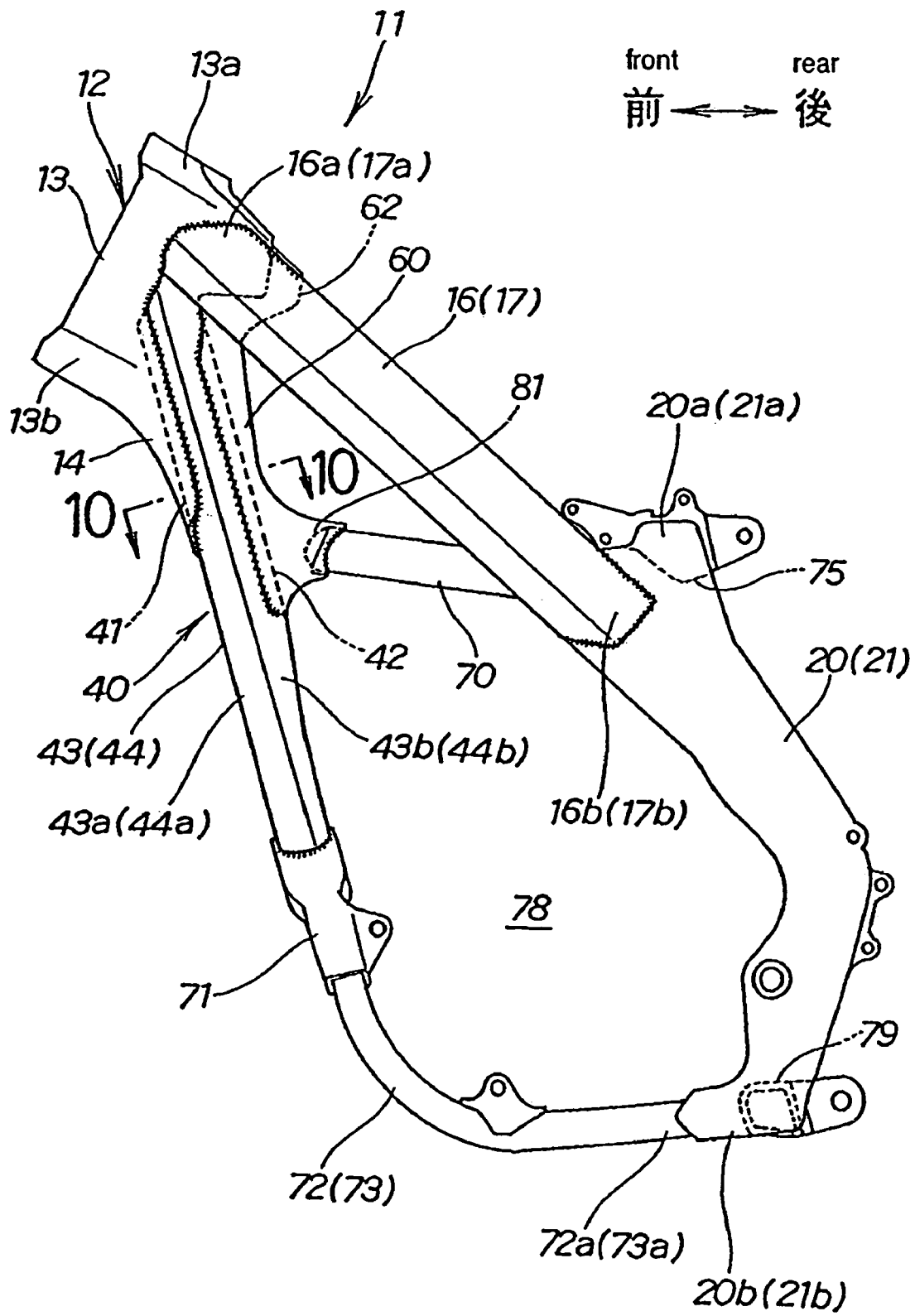
FIG. 2 is a side view showing the frame structure of FIG. 1.

FIG. 2 is a side view showing the frame structure 11 for a motorcycle according to the embodiment of the invention.

In the frame structure 11, the pair of right and left main pipes 17 and 16 extend rearward so as to be inclined downward from an upper part 13a of the head pipe 13. A down pipe 40 extends downward from front parts 16a and 17a of the main pipes 16 and 17 (also refer to FIGS. 3 to 5) and the head pipe 13. A front wall 41 side of the down pipe 40 is supported by a head pipe gusset 14 provided at a lower part 13b of the head pipe 13. A stiffener pipe gusset 60 is provided on a rear wall 42 side of the down pipe 40. A stiffener pipe 70 extends from the stiffener pipe gusset 60 to the right and left main pipes 17 and 16.

Further, in the frame structure 11, a pair of right and left pivot plates 21 and 20 (also refer to FIGS. 3 and 4) are joined to rear parts 17b and 16b of the pair of right and left main pipes 17 and 16, respectively. A pair of right and left lower pipes 73 and 72 (refer to FIG. 4) are attached to the down pipe 40 via a gusset 71. The right and left lower pipes 73 and 72 are joined to lower parts 21b and 20b of the pivot plates 21 and 20. The upper parts 21a and 20a of the right and left pivot plates 21 and 20 are coupled to each other via an upper supporting bracket 75 (also refer to FIG. 3), and the lower parts 21a and 20a of the right and left pivot plates 21 and 20 are coupled to each other via a lower supporting bracket 79 (also refer to FIG. 4).

The link mechanism 24 is attached to the lower supporting bracket 79 via a pin 76 (refer to FIG. 1).

In addition, in the frame structure 11, by rotatably attaching the front part of the rear swing arm 22 to the lower parts 21b and 20b of the right and left pivot plates 21 and 20 via a shaft 77 (refer to FIG. 1), the rear swing arm 22 is supported in a state where its rear portion extends rearward, and the engine 19 (refer to FIG. 1) is provided in a space 78 formed by the right and left main pipes 17 and 16, the right and left lower pipes 73 and 72, the down pipe 40, and the right and left pivot plates 21 and 20.

Figure 3:
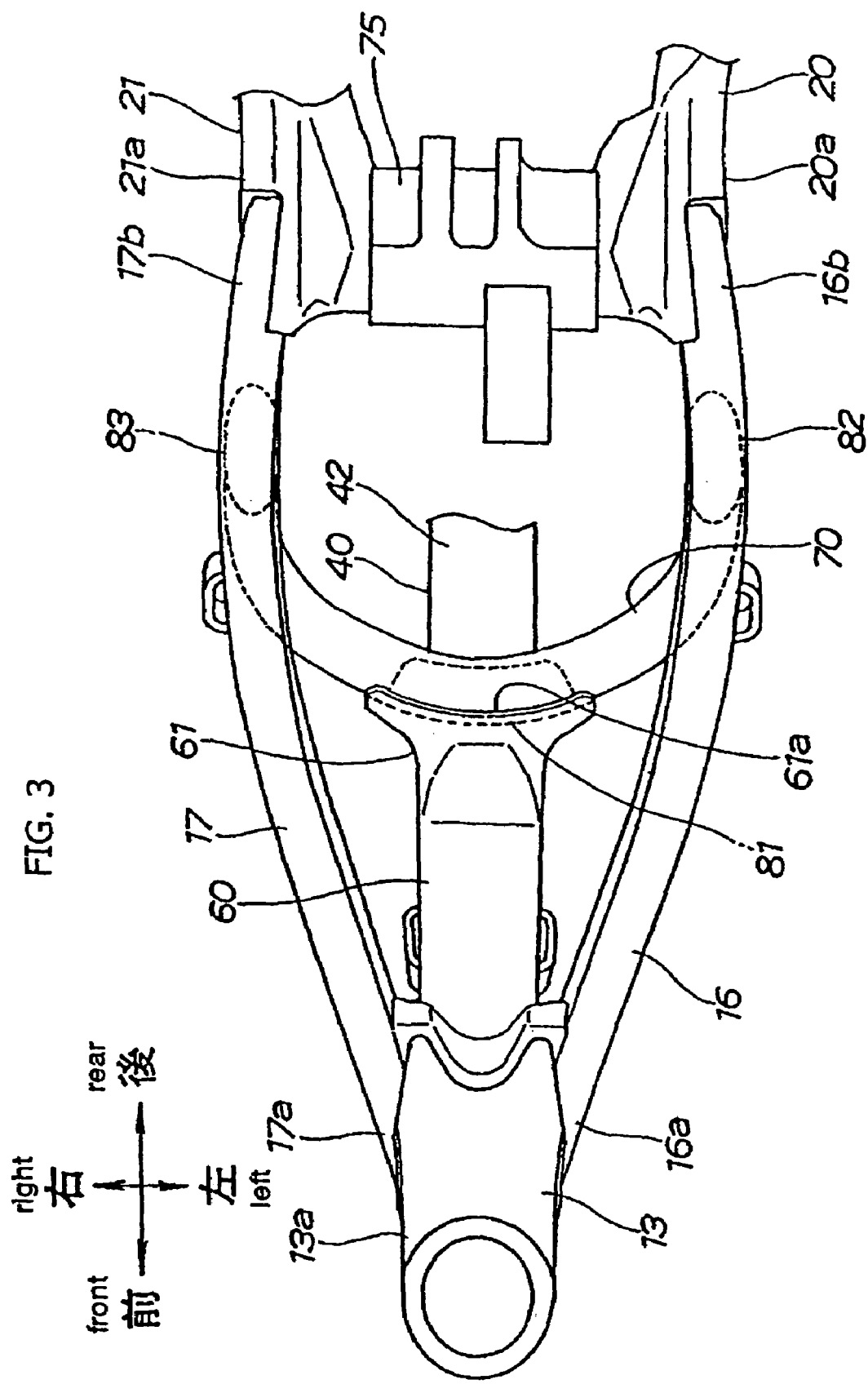
FIG. 3 is a plan view showing the frame structure of FIG. 1.

FIG. 3 is a plan view showing the frame structure of the motorcycle according to the embodiment of the invention.

The pair of right and left main pipes 17 and 16 extend rearward so as to be inclined downward from the upper part 13a of the head pipe 13 (also refer to FIG. 2), the pair of right and left pivot plates 21 and 20 are joined to the rear parts 17b and 16b of the pair of right and left main frames 17 and 16, respectively, and the upper parts 21a and 20a of the right and left pivot plates 21 and 20 are coupled to each other via the upper supporting bracket 75.

The stiffener pipe gusset 60 is provided on the rear wall 42 side of the down pipe 40, a curved housing recess 61a is formed so that its opening is directed rearward in a lower part 61 of the stiffener pipe gusset 60, and the stiffener pipe 70 is attached in a state where a front part 81 of the stiffener pipe 70 is fit in the housing recess 61a.

The stiffener pipe 70 is a pipe having an almost U shape formed in a curved state. The front part 81 of the stiffener pipe 70 is attached to the housing recess 61a, and right and left rear parts 83 and 82 of the stiffener pipe 70 are attached to the right and left main pipes 17 and 16, respectively.

Figure 4:
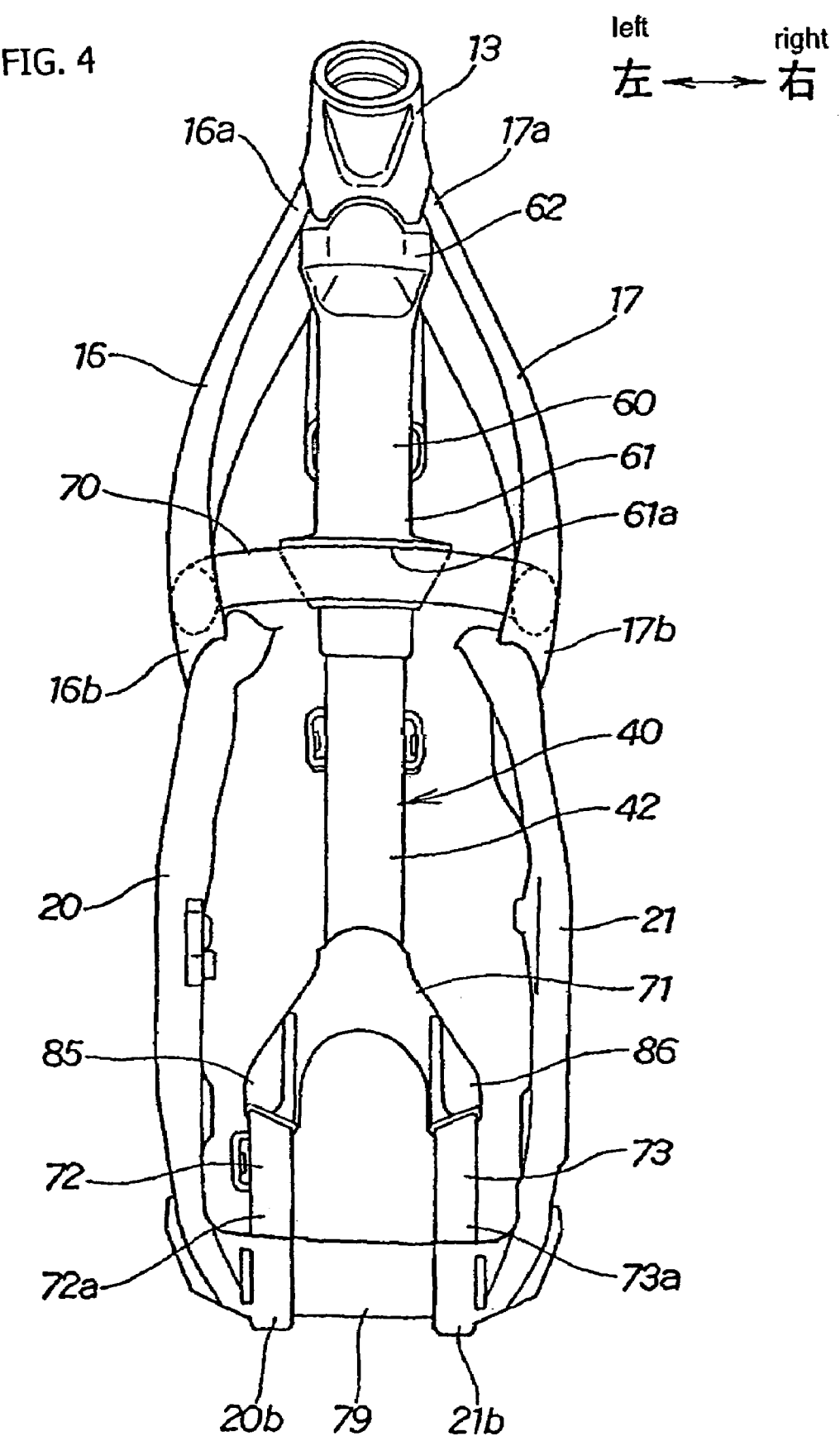
FIG. 4 is a rear view showing the frame structure of FIG. 1.

FIG. 4 is a rear view showing the frame structure of the motorcycle according to the embodiment of the invention.

The forked gusset 71 is attached to the down pipe 40, the right and left lower pipes 73 and 72 are attached to right and left rear parts 86 and 85 of the gusset 71, the right and left lower pipes 73 and 72 extend rearward, rear parts 73a and 72a of the right and left lower pipes 73 and 72 are joined to the lower parts 21b and 20b of the pivot plates 21 and 20, and the lower parts 21a and 20a of the right and left pivot plates 21 and 20 are coupled to each other via the lower supporting bracket 79.

The stiffener pipe gusset 60 extends upward from the lower part 61 along the rear wall 42 of the down pipe 40 (refer to FIG. 1), thereby attaching an upper part 62 of the stiffener pipe gusset 60 between the right and left main pipes 17 and 16 around the head pipe 13, specifically, between the front part 16a of the left main pipe 16 and the front part 17a of the right main pipe 17.

Therefore, by reinforcing the right and left main pipes 17 and 16 with the stiffener pipe gusset 60, the rigidity of the portion around the head pipe 13 can be enhanced.

Figure 5:
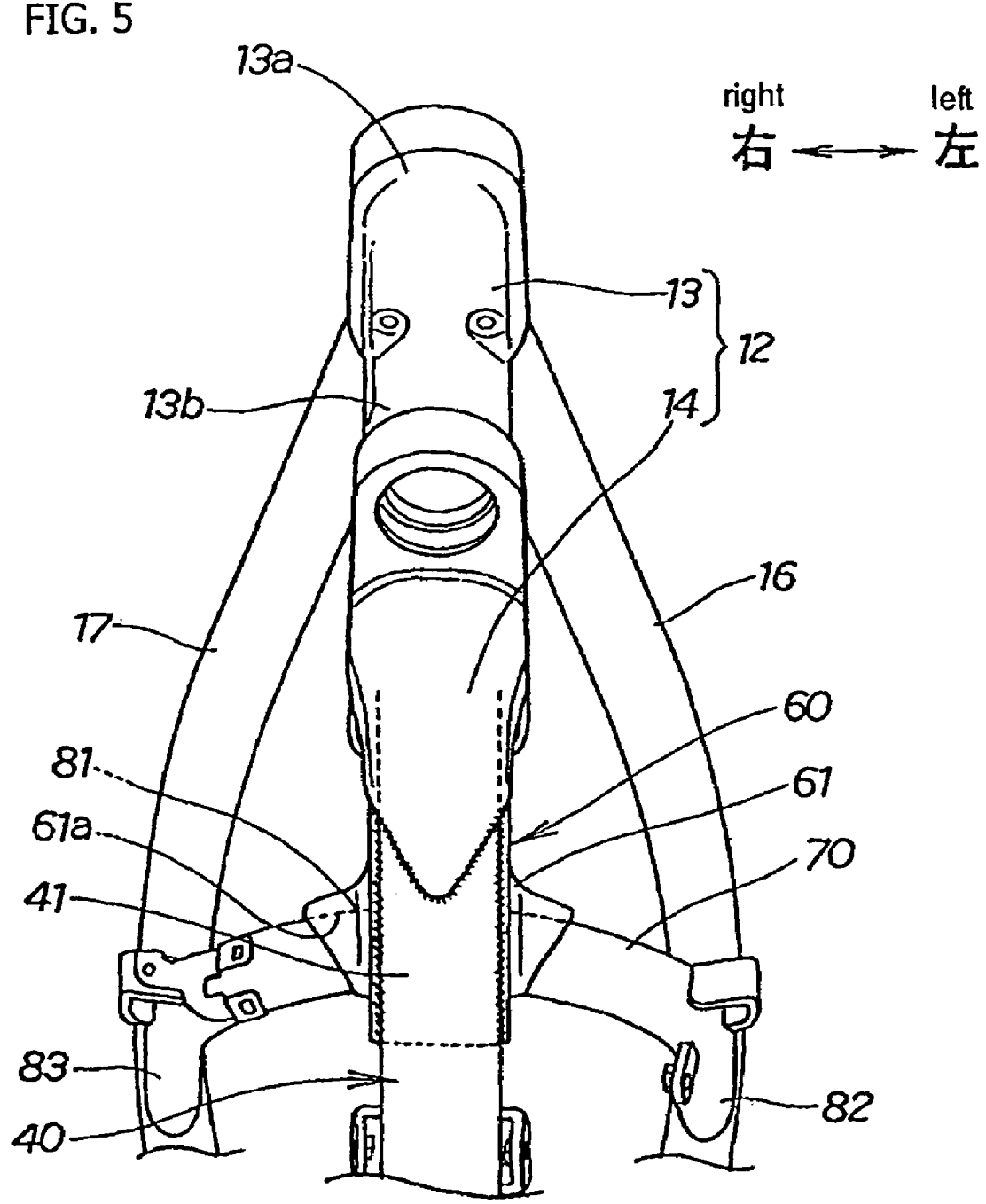
FIG. 5 is a front view partially showing the frame structure FIG. 1.

FIG. 5 is a front view showing the frame structure of the motorcycle according to the invention.

By extending the head pipe gusset 14 from the lower part 13b of the head pipe 13 along the front wall 41 of the down pipe 40, the head pipe unit 12 in which the head pipe 13 and the head pipe gusset 14 are integrated is constructed.

By extending the head pipe gusset 14 along the front wall 41 of the down pipe 40, the down pipe 40 is supported and reinforced by the head pipe gusset 14.

Again, the front part 81 of the stiffener pipe 70 is attached to the housing recess 61a, and the right and left rear parts 83 and 82 of the stiffener pipe 70 are attached to the right and left main pipes 17 and 16, respectively.

Figure 6:
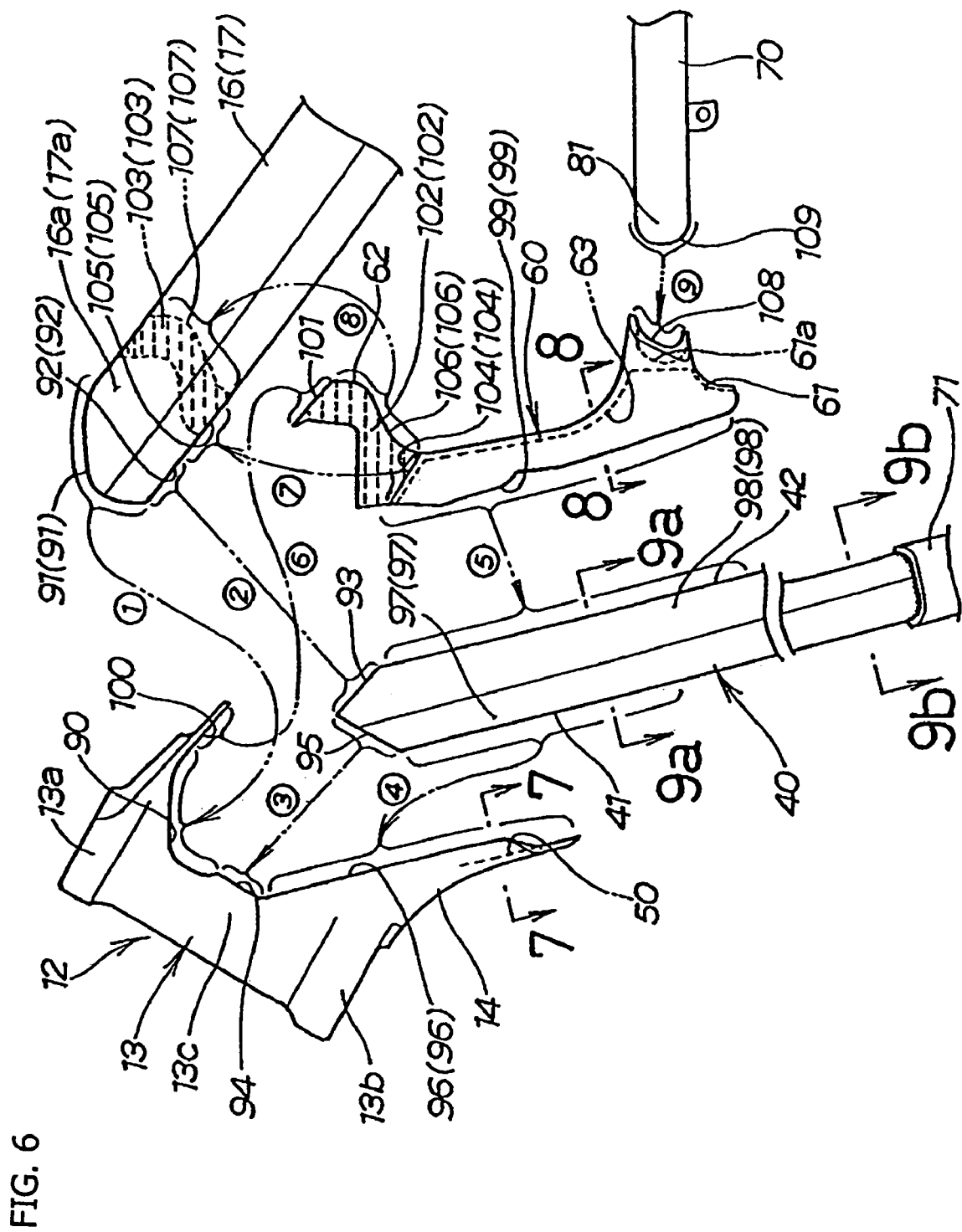
FIG. 6 is an exploded view showing important portions of the frame structure of FIG. 1.

FIG. 6 is an exploded view showing the frame structure of the motorcycle according to the embodiment of the invention.

In a first welding area 90 in the upper part 13a of the head pipe 13, second welding areas 91 and 91 of the front parts 17a and 16a of the pair of right and left main pipes 17 and 16 are butt welded as shown by an arrow.

In third welding areas 92 and 92 of the front parts 17a and 16a of the pair of right and left main pipes 17 and 16, a fourth welding area 93 of the down pipe 40 is butt welded as shown by an arrow.

In a fifth welding area 94 in a center part 13c of the head pipe 13, a sixth welding area 95 of the down pipe 40 is butt welded as shown by an arrow.

The front wall 41 side of the down pipe 40 is fit in a front fitting recess 50 of the head pipe gusset 14 as shown by an arrow, and seventh welding areas 96 and 96 of the head pipe gusset 14 and eighth welding areas 97 and 97 of the down pipe 40 are welded.

A rear fitting recess 63 of the stiffener pipe gusset 60 is fit to the rear wall 42 side of the down pipe 40 as shown by an arrow, and ninth welding areas 98 and 98 of the down pipe 40 and tenth welding areas 99 and 99 of the stiffener pipe gusset 60 are welded.

A twelfth welding area 101 of the upper part 62 of the stiffener pipe gusset 60 is butt welded to an eleventh welding area 100 of the upper part 13a of the head pipe 13 as shown by an arrow.

At this time, the upper part 62 of the stiffener pipe gusset 60 enters between the right and left main pipes 17 and 16 near the head pipe 13, and right and left first areas 102 and 102 of the stiffener pipe gusset 60 come into contact with second areas 103 and 103 of the right and left main pipes 17 and 16.

In this state, thirteenth welding areas 104 and 104 of the upper part 62 of the stiffener pipe gusset 60 are welded to fourteenth welding areas 105 and 105 of the right and left main pipes 17 and 16 as shown by an arrow.

Fifteenth welding areas 106 and 106 of the upper part 62 of the stiffener pipe gusset 60 are welded to sixteenth welding areas 107 and 107 of the right and left main pipes 17 and 16 as shown by an arrow.

In a state where the front part of the stiffener pipe 70 is fit in the housing recess 61a of the lower part 61 of the stiffener pipe gusset 60 as shown by an arrow □, a seventeenth welding area 108 of the stiffener pipe gusset 60 and an eighteenth welding area 109 of the stiffener pipe 70 are welded.

The head pipe unit 12 constructed by the head pipe 13 and the head pipe gusset 14 is a forged part, and the stiffener pipe gusset 60 is also a forged part.

Therefore, strength of the head pipe gusset 14 and the stiffener pipe gusset 60 can be enhanced.

Each of the head pipe gusset 14 and the stiffener pipe gusset 60 is forged, the front fitting recess 50 of the head pipe gusset 14 is provided on the front wall 41 side of the down pipe 40, and the rear fitting recess 63 of the stiffener pipe gusset 60 is provided on the rear wall 42 side of the down pipe 40.

Therefore, the front wall 41 side of the down pipe 40 can be reinforced by the head pipe gusset 14, and the rear wall 42 side of the down pipe 40 can be reinforced by the stiffener pipe gusset 60.

In such a manner, the rigidity of the down pipe 40 can be improved.

Figure 7:
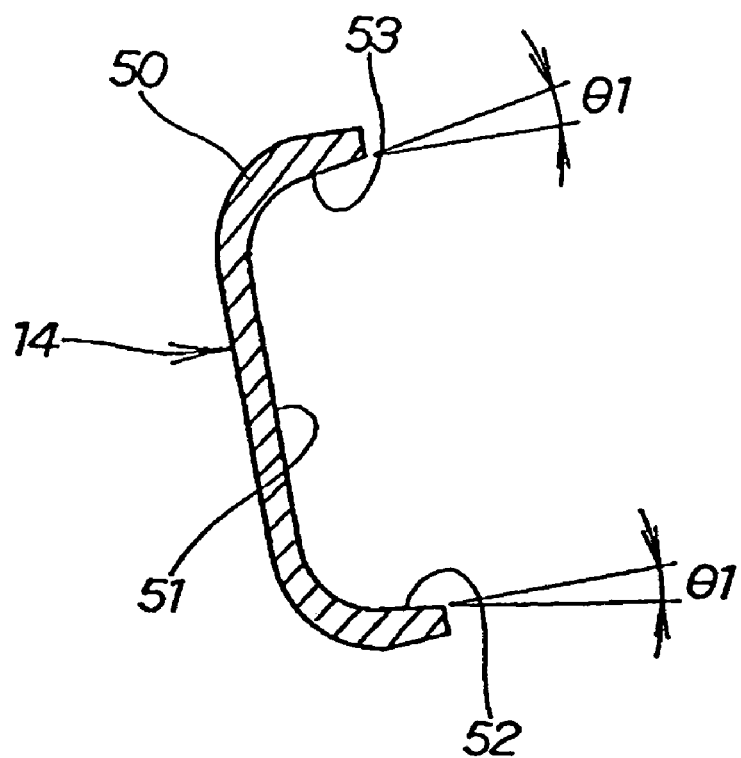
FIG. 7 is a cross section taken along line 7-7 of FIG. 6.

FIG. 7 is a cross section taken along line 7-7 of FIG. 6.

The head pipe gusset 14 has the front fitting recess 50. The front fitting recess 50 is formed in an almost U shape in cross section by a bottom face 51 and right and left side faces 53 and 52.

The head pipe unit 12 constructed of the head pipe 13 (refer to FIGS. 2 and 6-8) and the head pipe gusset 14 is a forged part. Consequently, a draft angle θ1 has to be assured for each of the right and left side faces 53 and 52 of the front fitting recess 50. The draft angle θ1 is a non-zero acute angle relative to a line transverse to the bottom face 51, as shown in FIGS. 7 and 8.

The front fitting recess 50 is a recess to which the front wall 41 of the down pipe 40 and front-half parts 44a and 43a of right and left sidewalls 44 and 43 are fit.

Figure 8:
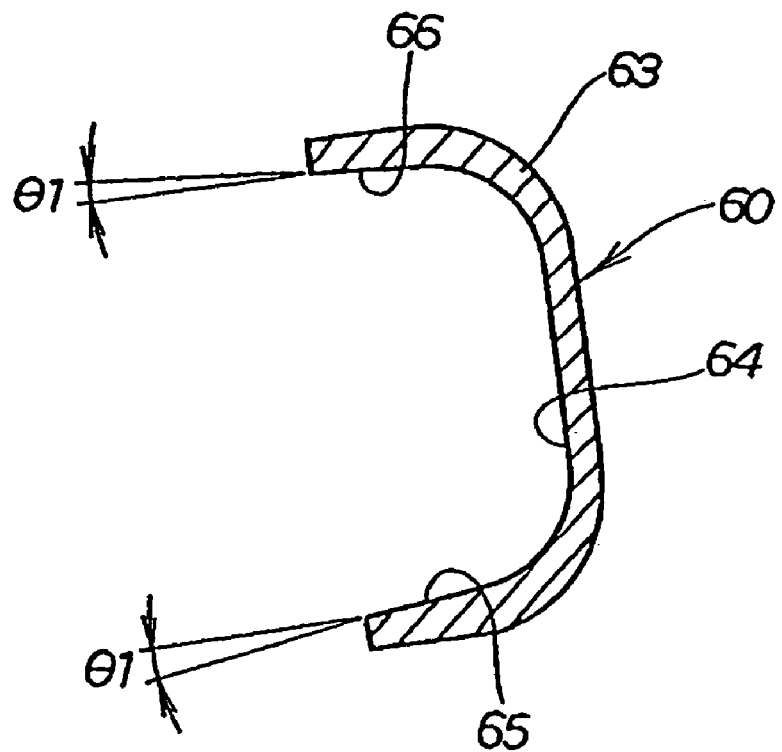
FIG. 8 is a cross section taken along line 8-8 of FIG. 6.

FIG. 8 is a cross section taken along line 8-8 of FIG. 6.

The stiffener pipe gusset 60 has the rear fitting recess 63. The rear fitting recess 63 is formed in an almost U shape in cross section by a bottom face 64 and right and left side faces 66 and 65.

The stiffener pipe gusset 60 is also a forged part. Consequently, the draft angle θ1 has to be assured for each of the right and left side faces 66 and 65 of the rear fitting recess 63.

Figure 9A:
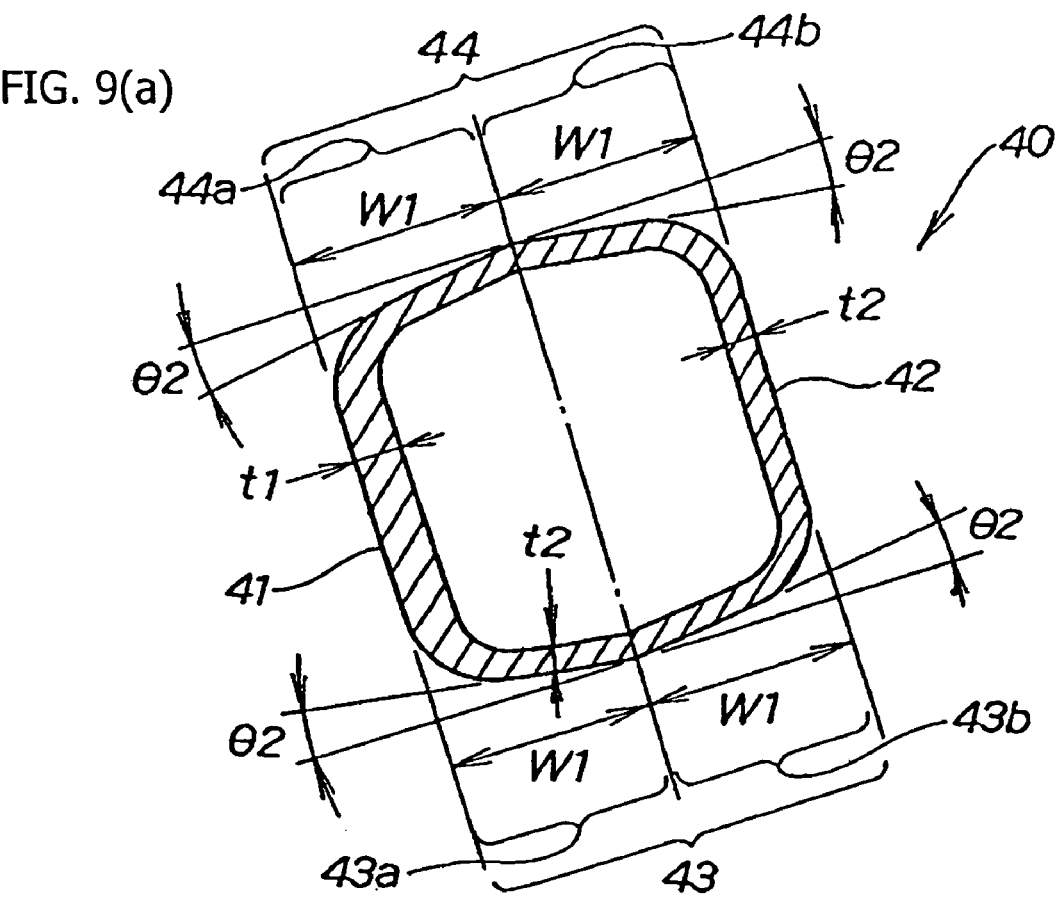
FIG. 9(*a*) is a cross section taken along line 9*a*-9*a* of FIG. 6, and FIG. 9(*b*) is a cross section taken along line 9*b*-9*b* of FIG. 6.

The rear fitting recess 63 is a recess to which the rear wall 42 of the down pipe 40 and rear-half parts 43b and 44b of the right and left side walls 44 and 43 shown in FIG. 9(a) are fit.

Figure 9B:
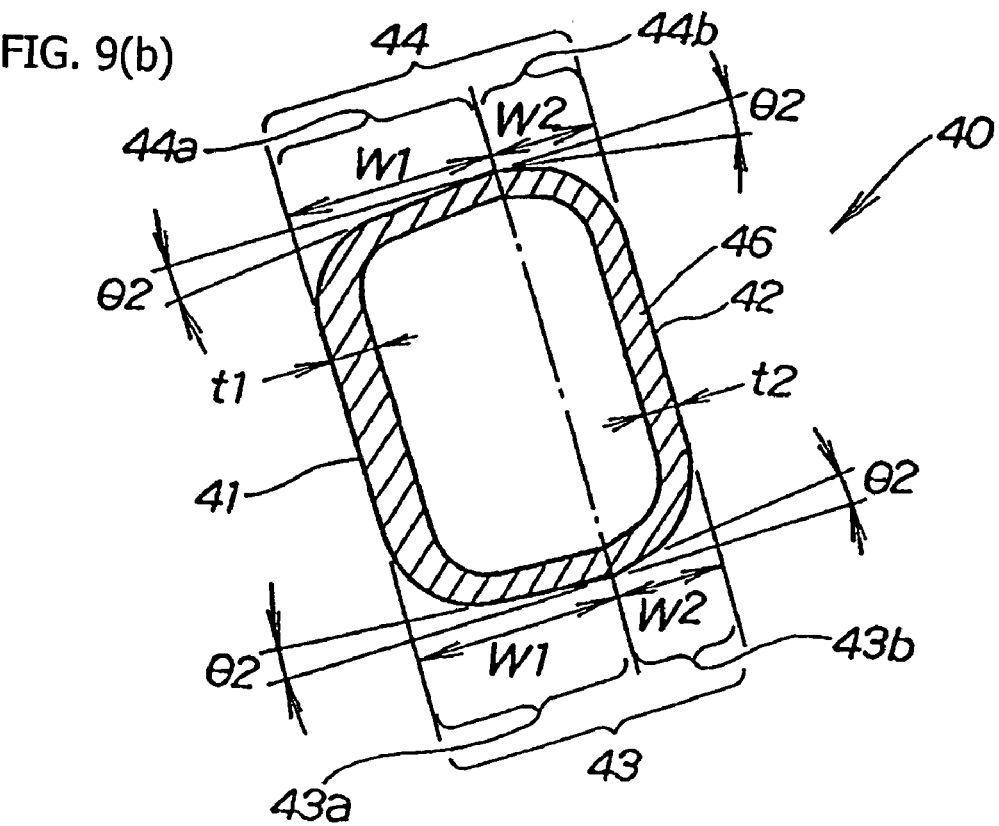

FIG. 9(a) is a cross section taken along line 9a-9a of FIG. 6, and FIG. 9(b) is a cross section taken along line 9b-9b of FIG. 6.

As shown in FIG. 9(a), the down pipe 40 is formed by extrusion molding in a tapered shape so as to be narrowed downward (refer to FIG. 2) and is formed in an almost rectangular shape in cross section by the front wall 41, rear wall 42, and right and left side-walls 44 and 43. The thickness t1 of the front wall 41 is larger than the thickness t2 of the rear wall 42 and the thickness t2 of each of the right and left sidewalls 44 and 43.

In the down pipe 40, the front-half parts 44a and 43a of the right and left side walls 44 and 43 are inclined in accordance with the draft angle θ1 of the right and left side faces 53 and 52 constructing the front fitting recess 50 of the head pipe gusset 14 shown in FIG. 7.

Particularly, by inclining the front-half parts 44a and 43a of the right and left sidewalls 44 and 43 at the inclination angle θ2, the width between the front-half parts 43a and 44a is gradually reduced toward the front wall 41.

Further, in the down pipe 40, the rear-half parts 44b and 43b of the right and left side walls 44 and 43 are inclined in accordance with the draft angle θ1 of the right and left side faces 66 and 65 constructing the rear fitting recess 63 of the stiffener pipe gusset 60 shown in FIG. 8.

Particularly, by inclining the rear-half parts 44b and 43b of the right and left sidewalls 44 and 43 at the inclination angle θ2, the width between the rear-half parts 43b and 44b is gradually reduced toward the rear wall 42.

The front-half parts 44a and 43a and the rear-half parts 44b and 43b constructing the right and left side walls 44 and 43 are formed so as to have the same width W1.

FIG. 9(b) is a cross section showing a lower part 46 (refer to FIG. 6) of the down pipe 40. The cross section of the lower part 46 of the down pipe 40 is the same as that of FIG. 9(a) except that the width of each of the rear-half parts 44b and 43b of the right and left side walls 44 and 43 is decreased to the width W2.

Figure 10A:
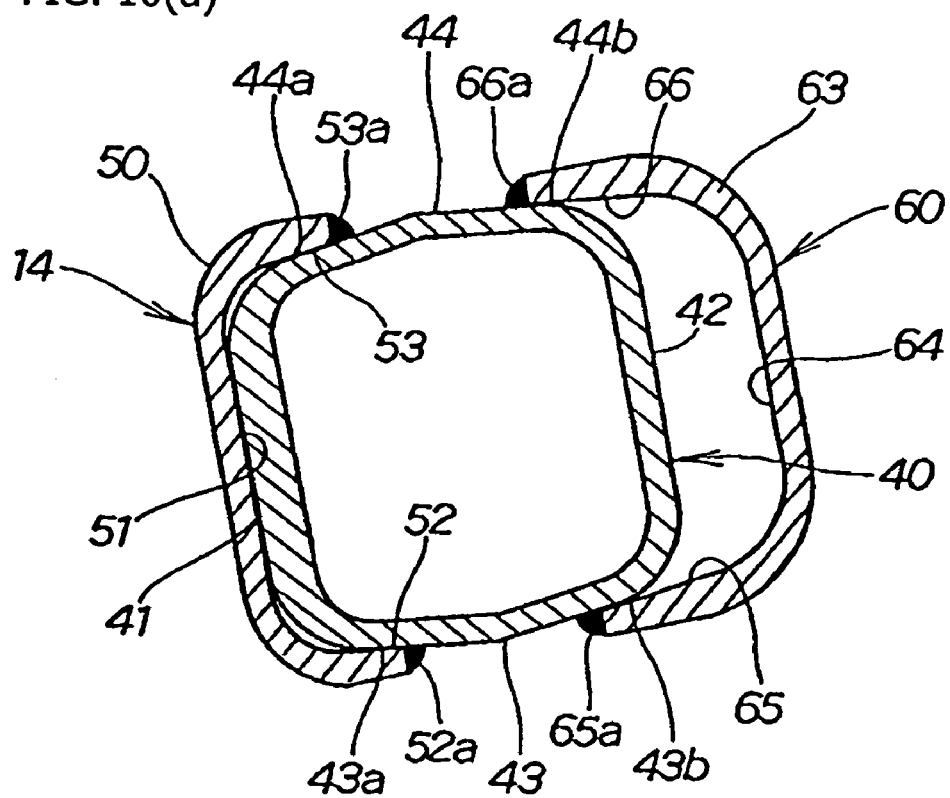
FIG. 10(*a*) is a cross section taken along line 10-10 of FIG. 2, and FIG. 10(*b*) is a cross section showing a comparative example.
Figure 10B:
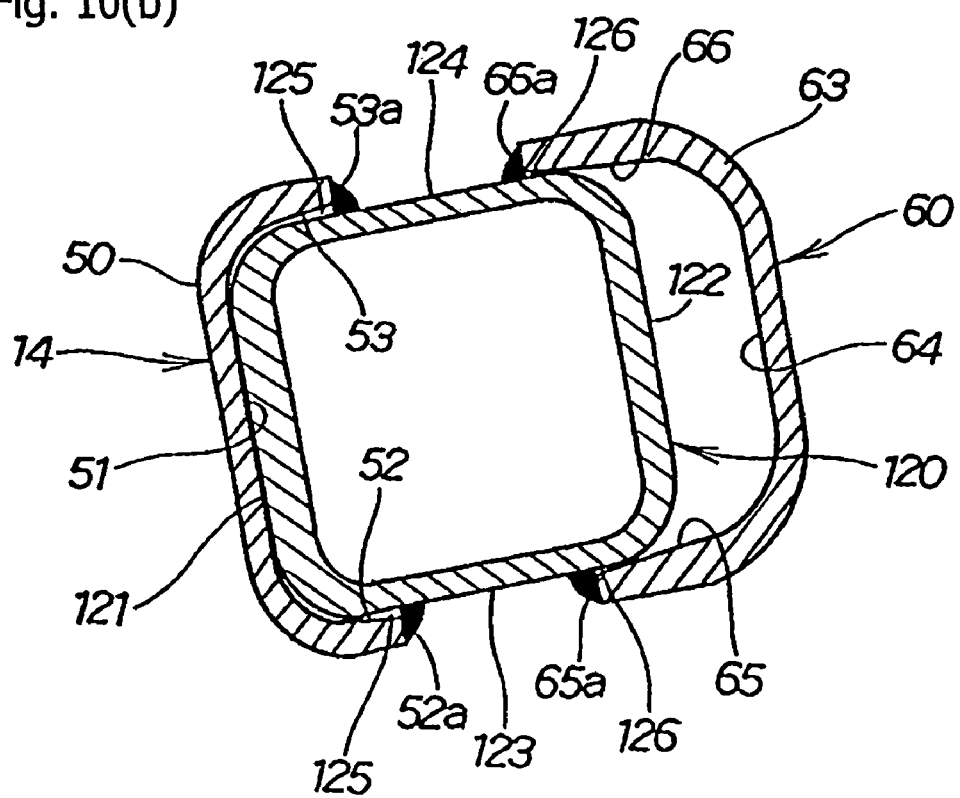

FIG. 10(a) is a cross section taken along line 10-10 of FIG. 2, and FIG. 10(b) is a cross section showing a comparative example.

In FIG. 10(a), in the down pipe 40, the front-half parts 44a and 43a of the right and left side walls 44 and 43 are inclined at the inclination angle θ2 (refer to FIGS. 7 and 9(a)) in accordance with the draft angle θ1 of the right and left side faces 53 and 52 constructing the front fitting recess 50 of the head pipe gusset 14.

Further, in the down pipe 40, the rear-half parts 44b and 43b of the right and left side walls 44 and 43 are inclined at the inclination angle θ2 (refer to FIGS. 8 and 9(b)) in accordance with the draft angle θ1 of the right and left side faces 65 and 66 constructing the rear fitting recess 63 of the stiffener pipe gusset 60.

Therefore, the right and left side faces 53 and 52 of the front fitting recess 50 can be fit to the front-half parts 44a and 43a of the right and left side walls 44 and 43 without a gap.

In this state, peripheries 53a and 52a of the right and left side faces 53 and 52 are welded to the front-half parts 44a and 43a.

Further, the right and left side faces 66 and 65 of the rear fitting recess 63 can be fit to the rear-half parts 44b and 43b of the right and left side walls 44 and 43 without a gap.

In this state, peripheries 66a and 65a of the right and left side faces 66 and 65 are welded to the rear-half parts 44b and 43b.

By the arrangement of the discussed embodiment of the invention, quality of welding between the front fitting recess 50 in the head pipe gusset 14 and the front-half parts 44a and 43a of the down pipe 40 can be improved.

Further, quality of welding between the rear fitting recess 63 in the stiffener pipe gusset 60 and the rear-half parts 44b and 43b of the down pipe 40 can be improved.

In FIG. 10(b), a down pipe 120 has an almost rectangular shape in cross section formed by a front face 121, a rear face 122, and right and left side faces 124 and 123, and the right and left side faces 124 and 123 are formed in the same width without being inclined unlike the down pipe 40 of FIG. 10(*a*).

That is, the down pipe 120 is different from the down pipe 40 shown in FIG. 10(*a*) only with respect to the point that the right and left side faces 124 and 123 are formed in the same width without being inclined.

Since the right and left side faces 124 and 123 of the down pipe 120 are formed in the same width without being inclined, when the right and left side faces 53 and 52 of the front fitting recess 50 in the head pipe gusset 14 are fit to the front face 121 side of the down pipe 120, gaps 125 and 125 are generated between the right and left side faces 53 and 52 and the right and left side faces 124 and 123.

Therefore, even when the peripheries 53*a* and 52*a* of the right and left side faces 53 and 52 are welded to the right and left side faces 124 and 123, quality of welding between the front fitting recess 50 in the head pipe gusset 14 and the down pipe 120 cannot be improved.

Further, since the right and left side faces 124 and 123 of the down pipe 120 are formed in the same width without being inclined, when the right and left side faces 66 and 65 of the rear fitting recess 63 in the stiffener pipe gusset 60 are fit to the rear face 122 side of the down pipe 120, gaps 126 and 126 are generated between the right and left side faces 66 and 65 and the right and left side faces 124 and 123.

Therefore, even when the peripheries 66*a* and 65*a* of the right and left side faces 66 and 65 are welded to the right and left side faces 124 and 123, quality of welding between the rear fitting recess 63 in the stiffener pipe gusset 60 and the down pipe 120 cannot be improved.

Figure 11:
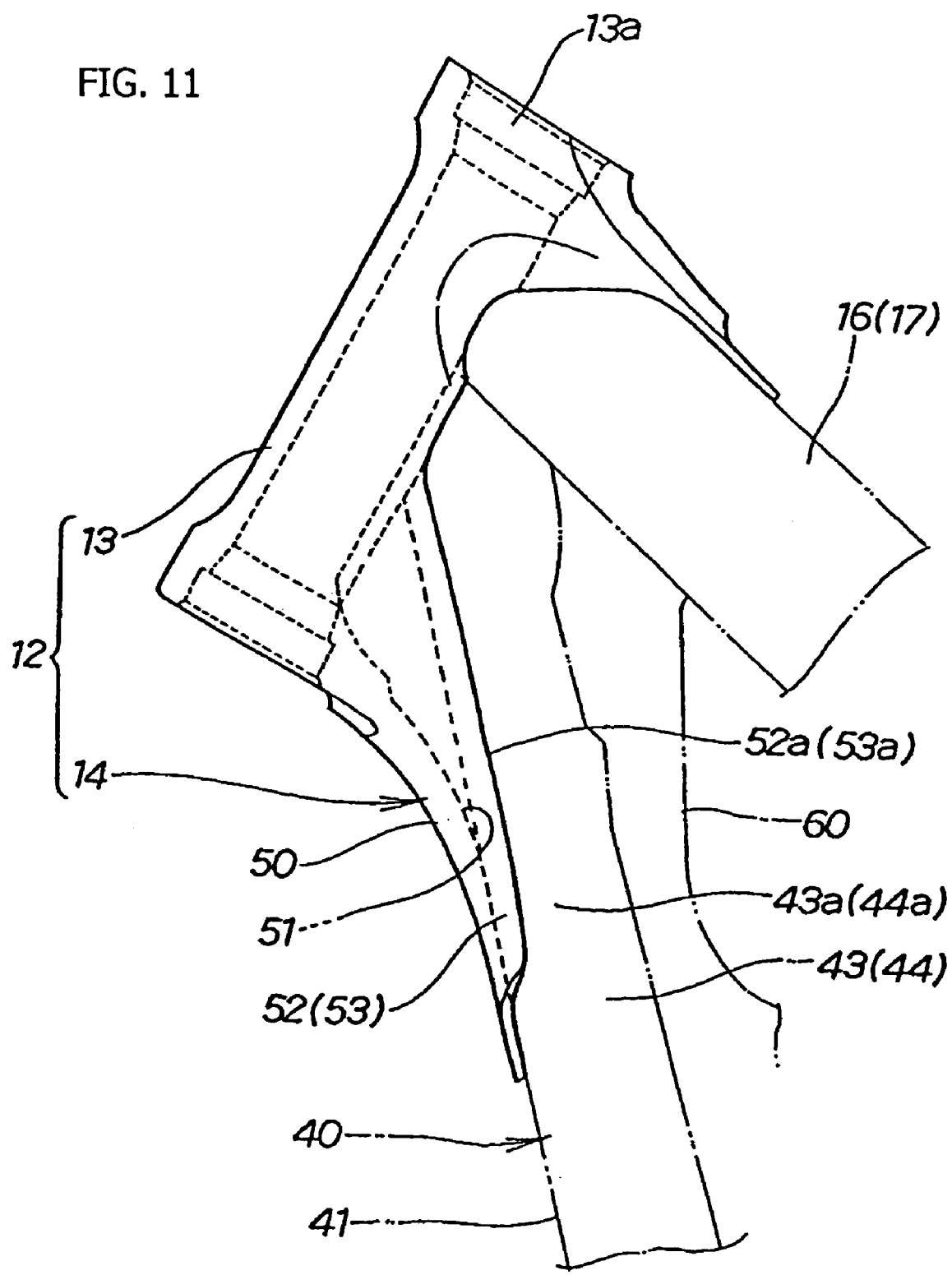
FIG. 11 is a side view showing a head pipe unit as a component of the frame structure of FIG. 1.

FIG. 11 is a side view showing the head pipe unit as a component of the frame structure of the motorcycle according to the embodiment of the invention.

The head pipe unit 12 is a forged part constructed by the cylindrical head pipe 13 for attaching the front fork 28 (refer to FIG. 1) and the head pipe gusset 14 integrally formed with the lower part of the head pipe.

The head pipe gusset 14 has the front fitting recess 50. The front fitting recess 50 is formed in an almost U shape in cross section by the bottom face 51 and the right and left side faces 53 and 52 (refer to FIGS. 7 and 10).

The front wall 41 and the front half parts 44*a* and 43*a* of the right and left side walls 44 and 43 of the down pipe 40 are fit to the front fitting recess 50, and the peripheries 53*a* and 52*a* of the right and left side faces 53 and 52 are welded to the front-half parts 44*a* and 43*a*. In such a manner, the down pipe 40 can be supported and reinforced with the head pipe gusset 14.

Figure 12:
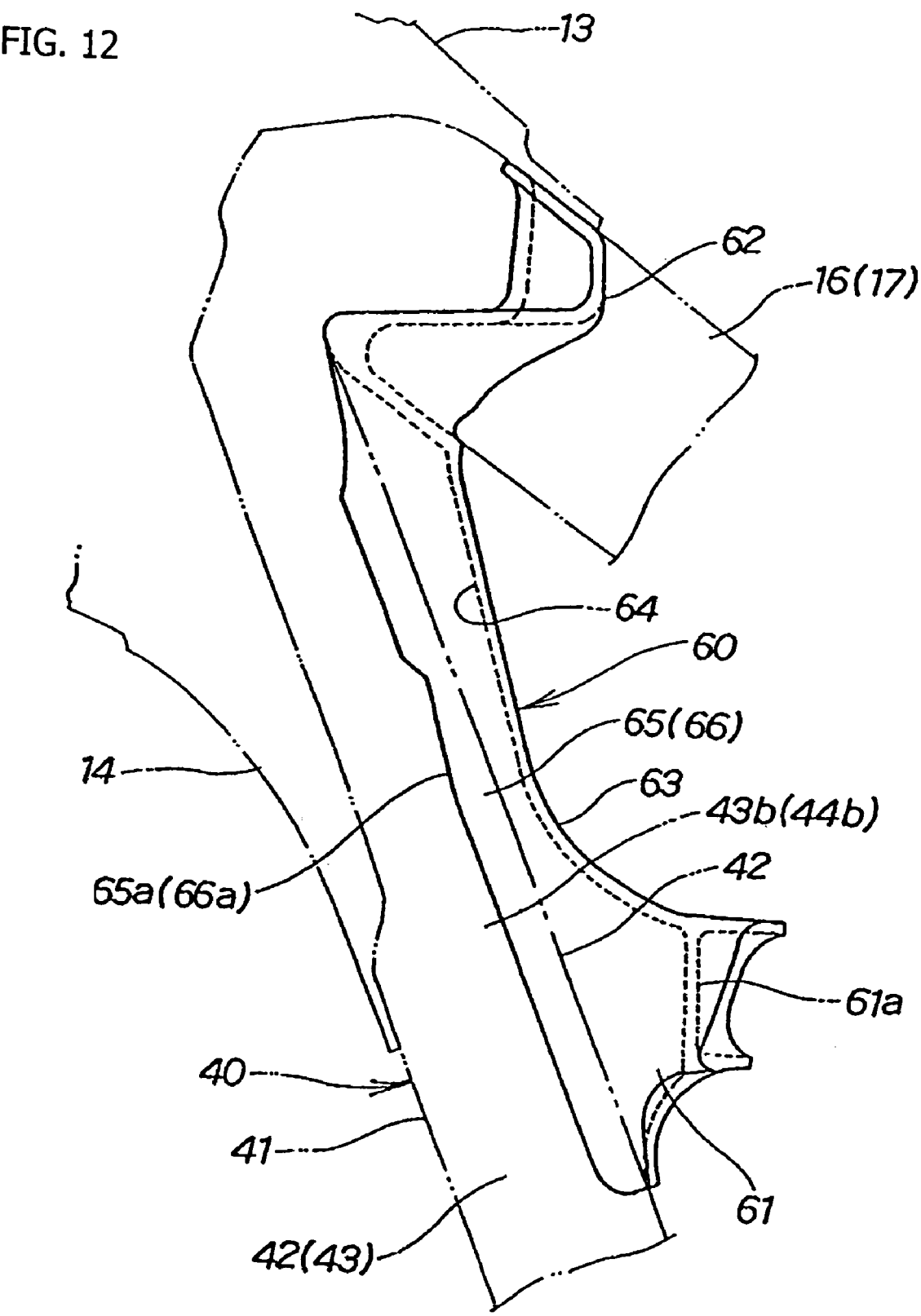
FIG. 12 is a side view showing a stiffener pipe unit as a component of the frame structure of FIG. 1.

FIG. 12 is a side view showing a stiffener pipe unit as a component of the frame structure of the motorcycle according to the embodiment of the invention.

The stiffener pipe gusset 60 has the upper part 62 at the upper end of the rear fitting recess 63 and the lower part 61 at the lower end.

By attaching the upper part 62 between the right and left main pipes 17 and 16 near the head pipe 13, the right and left main pipes 17 and 16 can be reinforced with the upper part 62 of the stiffer pipe gusset 60.

Since the stiffener pipe gusset 60 can be therefore used also as the reinforcing member of the right and left main pipes 17 and 16, it is unnecessary to separately provide a member for reinforcing the main pipes 17 and 16.

Therefore, the number of parts can be reduced, assembly and parts management can be simplified.

The curved housing recess 61*a* is formed so that its opening is directed rearward in the lower part 61 of the stiffener pipe gusset 60, and the front part 81 (refer to FIG. 2) of the stiffener pipe 70 is fit in the housing recess 61*a*.

The rear fitting recess 63 is formed in an almost U shape in cross section by the bottom face 64 and the right and left side faces 66 and 65 of the stiffener pipe gusset 60 (refer to FIGS. 8 and 10(*a*)).

The rear wall 42 and the rear-half parts 44*b* and 43*b* of the right and left side walls 43 and 44 of the down pipe 40 are fit to the rear fitting recess 63, and the peripheries 66*a* and 65*a* of the right and left side faces 66 and 65 are welded to the rear-half parts 44*b* and 43*b*.

In such a manner, the down pipe 40 is supported and reinforced by the stiffener pipe gusset 60.

Figure 13:
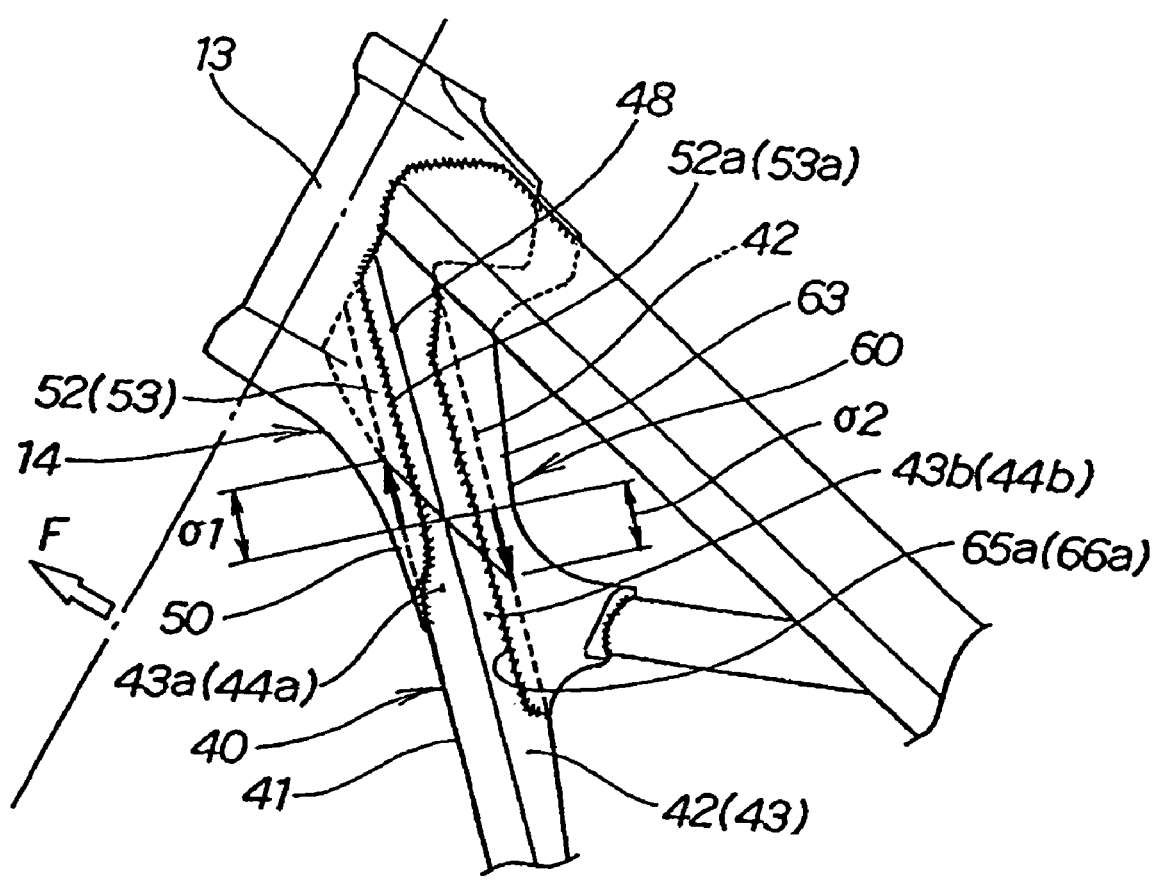
FIG. 13 is a diagram for explaining the action of the frame structure of FIG. 1.
Figure 14:
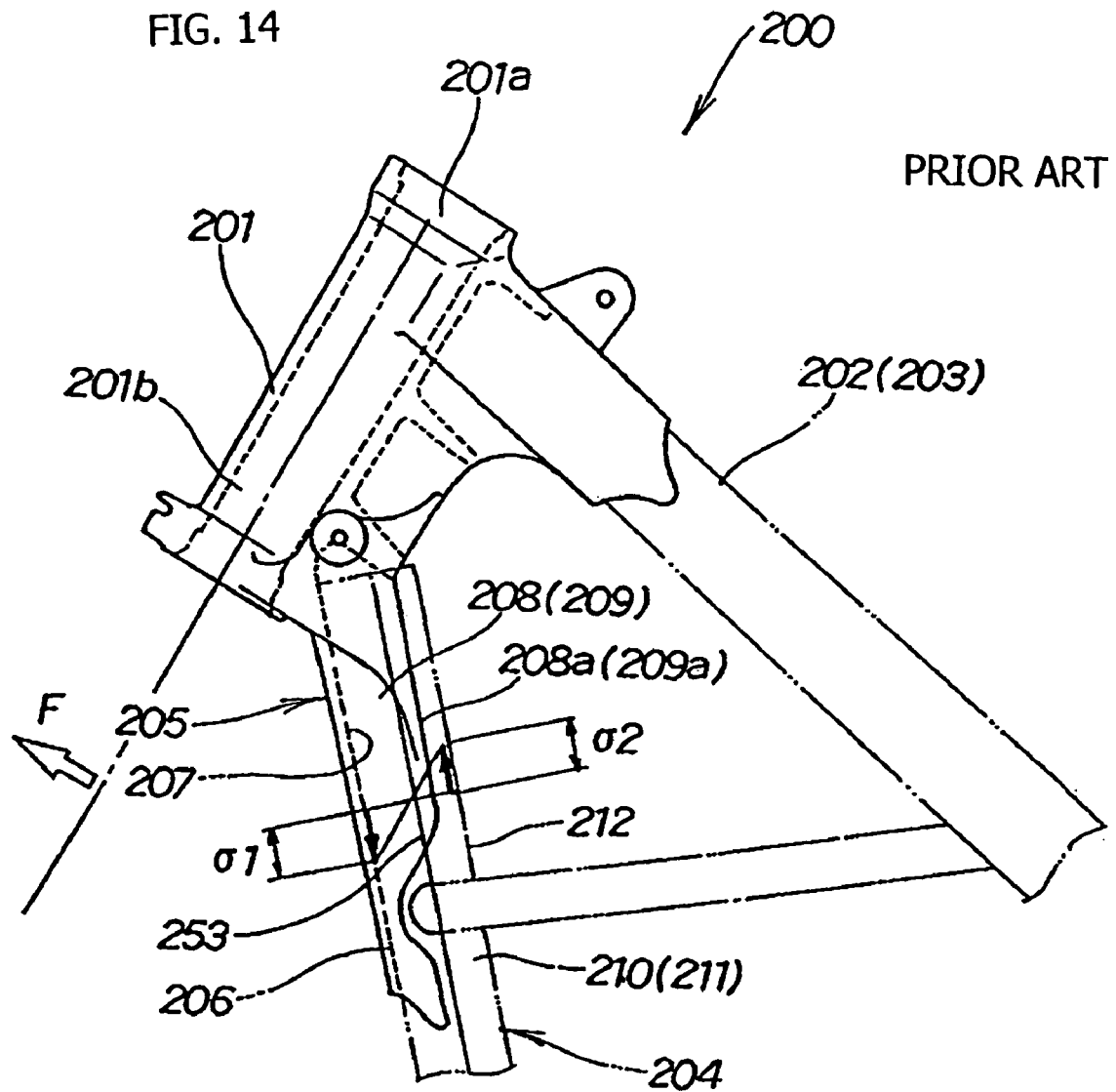
FIG. 14 is a side view similar to FIG. 13 but showing a conventional motorcycle frame structure.

FIG. 13 is a diagram for explaining the action of the frame structure of the motorcycle according to the embodiment of the invention.

In the case where a load F is applied to the head pipe 13 via a (not-shown) front fork toward the front part of the body as shown by an arrow, bending stress is produced in the down pipe 40, maximum tensile stress $\sigma 1$ is produced in the front wall 41, and maximum compressive stress $\sigma 2$ is produced in the rear wall 42.

On the other hand, the produced stress becomes smaller toward the center 48 of the right and left sidewalls 43 and 42 constructing the down pipe 40, that is, a neutral plane in section.

Consequently, the front wall 41 and the right and left front-half parts 44*a* and 43*a* (refer to FIG. 10(*a*)) of the down pipe 40 are fit to the front fitting recess 50 in the head pipe gusset 14, and the peripheries 53*a* and 52*a* of the right and left side faces 53 and 52 are welded to the front-half parts 44*a* and 43*a*, that is, a portion where no large stress is produced.

Further, the rear wall 42 and the right and left front-half parts 44*b* and 43*b* (refer to FIG. 10(*a*)) of the down pipe 40 are fit to the rear fitting recess 63 in the stiffener pipe gusset 60, and the peripheries 66*a* and 65*a* of the right and left side faces 66 and 65 are welded to the rear-half parts 44*b* and 43*b*, that is, a portion where no large stress is produced.

Therefore, the welding part between the front fitting recess 50 in the head pipe gusset 14 and the down pipe 40 and the welding part between the rear fitting recess 63 in the stiffener pipe gusset 60 and the down pipe 40 can be prevented from being subjected to large stress.

The shapes and thickness of the front fitting recess 50 in the head pipe gusset 14, the rear fitting recess 63 in the stiffener pipe gusset 60, the down pipe 40, and the like described in the embodiment above are not limited to those in the foregoing embodiment, but can be properly selected.

The present invention produces the following effects and advantages by the above configuration.

In the first aspect hereof, each of the head pipe gusset and the stiffener pipe gusset is forged, the front fitting recess of the head pipe gusset is provided for the front wall side of the down pipe, and the rear fitting recess of the stiffener pipe gusset is provided for the rear wall side of the down pipe.

Therefore, the front wall side of the down pipe can be reinforced with the head pipe gusset, and the rear wall side of the down pipe can be reinforced with the stiffener pipe gusset, thereby enabling the rigidity of the down pipe to be improved.

Further, the rear fitting recess in which the rear wall and rear-half parts of the right and left side walls of the down pipe can be fit is provided with the head pipe gusset, and the rear fitting recess in which the rear wall and rear-half parts of the right and left side walls of the down pipe can be fit is provided with the stiffener pipe gusset.

The periphery of the front fitting recess is welded to the right and left front-half parts, and the periphery of the rear fitting recess is welded to the right and left rear-half parts.

Therefore, the head pipe gusset and the stiffener pipe gusset can be welded while avoiding the front and rear walls of the down pipe, in which relatively large stress is produced, and each of the welded parts can be prevented from being subjected to large stress.

In addition, by forming the head pipe gusset and the stiffener pipe gusset by forging, while maintaining required rigidity of the head pipe gusset and the stiffener pipe gusset, weight and thickness can be reduced.

Further, the front-half parts of the right and left side walls of the down pipe are inclined in accordance with the draft angle of the front fitting recess, and the rear-half parts of the right and left side walls of the down pipe are inclined in accordance with the draft angle of the rear fitting recess.

When the front fitting recess is fit to the front side of the down pipe, gaps between the front fitting recess and the right and left front-half parts can be reduced and gaps between the rear fitting recess and the right and left rear-half parts can be reduced.

Therefore, the quality of welding between the front fitting recess and the right and left front-half parts and the quality of welding between the rear fitting recess and the right and left rear-half parts can be improved.

In the second aspect hereof, the stiffener pipe gusset extends to a portion between the right and left main pipes near the head pipe, thereby enabling the right and left main pipes to be reinforced by the stiffener pipe gusset and enabling rigidity of the portion around the head pipe to be increased.

Further, since the stiffener pipe gusset can be also used as a reinforcing member for the main pipe, it is unnecessary to separately provide a reinforcing member for the main pipes.

In other words, since the stiffener pipe gusset can be also used as a reinforcing member for the main pipe, the number of parts can be reduced. Thus, the assembling work process and the parts management can be simplified.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications are within the scope of the claims, are intended to be within the scope and spirit of the invention.

Having thus, described the invention, what is claimed is:

1. A frame structure for a motorcycle, said frame structure comprising:
   a head pipe;
   a pair of right and left main pipes extending rearwardly and downwardly from an upper part of the head pipe;
   a down pipe extending from front parts of the main pipes and said head pipe;
   a head pipe gusset provided in a lower part of the head pipe and supporting a front wall side of the down pipe;
   a stiffener pipe gusset provided on a rear wall side of the down pipe; and
   a stiffener pipe extending from the stiffener pipe gusset to the main pipes;
   said head pipe gusset being forged integrally with said head pipe and including a tapered front fitting recess to which a front wall and front-half parts of right and left side walls of said down pipe can be fit, said front fitting recess being wider at an open outer end than at an inner end thereof;
   said stiffener pipe gusset being forged and including a tapered rear fitting recess in which a rear wall and rear-half parts of the right and left side walls of the down pipe can be fit, said rear fitting recess being wider at an open outer end than at an inner end thereof;
   wherein a cross-sectional shape of said down pipe is configured such that said right and left front-half parts of said down pipe are inclined in accordance with a non-zero acute draft angle of the front fitting recess, the draft angle being formed at the time of said forging, such that said cross-sectional shape is wider at a central portion of said down pipe than at a front wall side,
   and wherein said right and left rear-half parts of said down pipe are inclined in accordance with a non-zero acute draft angle of the rear fitting recess, the draft angle being formed at the time of forging;
   wherein the front wall and the right and left front-half parts of said down pipe are fit into the front fitting recess and a periphery of the front fitting recess is welded to the right and left front-half parts; and
   wherein the rear wall and right and left rear-half parts of said down pipe are fit into the rear fitting recess and a periphery of the rear fitting recess is welded to the right and left rear-half parts.

2. The frame structure for a motorcycle according to claim 1, wherein said stiffener pipe gusset extends to a portion between the right and left main pipes near said head pipe.

3. The frame structure for a motorcycle according to claim 1, wherein an upper portion of said stiffener pipe gusset is welded to the right and left main pipes and to said head pipe.

4. The frame structure for a motorcycle according to claim 1, wherein the peripheries of the front fitting recess and the rear fitting recess are welded to the right and left rear-half parts and to the right and left front-half parts near centers of right and left side walls of the down pipe.

5. The frame structure for a motorcycle according to claim 1, wherein said right and left rear-half parts of the down tube are inclined such that a width of the down tube is gradually reduced from centers of right and left side walls of the down pipe toward front and rear walls of the down pipe.

6. A frame structure for a motorcycle, said frame structure comprising:
   a head pipe;
   a pair of right and left main pipes extending rearwardly and downwardly from an upper part of the head pipe;
   a down pipe extending from front parts of the main pipes and said head pipe;
   a head pipe gusset provided in a lower part of the head pipe and supporting a front wall side of the down pipe;
   a stiffener pipe gusset provided on a rear wall side of the down pipe; and
   a stiffener pipe extending from the stiffener pipe gusset to the main pipes;
   said head pipe gusset being forged integrally with said head pipe and including a tapered front fitting recess to which a front wall and front-half parts of right and left side walls of said down pipe can be fit, said front fitting recess being wider at an open outer end than at an inner end thereof;
   said stiffener pipe gusset being forged and including a tapered rear fitting recess in which a rear wall and rear-half parts of the right and left side walls of the down pipe can be fit, said rear fitting recess being wider at an open outer end than at an inner end thereof;

wherein a cross-sectional shape of said down pipe is configured such that said right and left front-half parts of said down pipe are inclined in accordance with a non-zero acute draft angle of the front fitting recess, the draft angle being formed at the time of said forging, such that said cross-sectional shape is wider at a central portion of said down pipe than at a front wall side, and wherein said right and left rear-half parts are inclined in accordance with a non-zero acute draft angle of the rear fitting recess, the draft angle being formed at the time of forging; and peripheries of the front fitting recess and said rear fitting recess being welded to portions of said down pipe in which stresses are substantially minimized when the motorcycle is used.

7. The frame structure for a motorcycle according to claim 6, wherein said stiffener pipe gusset extends to a portion between the right and left main pipes near said head pipe.

8. The frame structure for a motorcycle according to claim 6, wherein an upper portion of said stiffener pipe gusset is welded to the right and left main pipes and to said head pipe.

9. The frame structure for a motorcycle according to claim 6, wherein the peripheries of the front fitting recess and the rear fitting recess are welded to the right and left rear-half parts and to the right and left front-half parts near centers of right and left side walls of the down pipe.

10. The frame structure for a motorcycle according to claim 6, wherein said right and left rear-half parts of the down tube are inclined such that a width of the down tube is gradually reduced from centers of right and left side walls of the down pipe toward front and rear walls of the down pipe.

* * * * *